United States Patent
Anandan

(10) Patent No.: US 11,271,195 B2
(45) Date of Patent: Mar. 8, 2022

(54) HYBRID ELECTROLYTE DESIGN FOR TITANIUM NIOBIUM OXIDE BASED LITHIUM BATTERY

(71) Applicant: Ford Global Technologies, LLC, Dearborn, MI (US)

(72) Inventor: Venkataramani Anandan, Farmington Hills, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 246 days.

(21) Appl. No.: 16/505,335

(22) Filed: Jul. 8, 2019

(65) Prior Publication Data

US 2021/0013486 A1     Jan. 14, 2021

(51) Int. Cl.

| | |
|---|---|
| *H01M 2/16* | (2006.01) |
| *H01M 4/131* | (2010.01) |
| *H01M 10/0525* | (2010.01) |
| *H01M 10/0565* | (2010.01) |
| *H01M 10/0562* | (2010.01) |
| *H01M 50/46* | (2021.01) |
| *H01M 4/02* | (2006.01) |

(52) U.S. Cl.
CPC ....... *H01M 4/131* (2013.01); *H01M 10/0525* (2013.01); *H01M 10/0562* (2013.01); *H01M 10/0565* (2013.01); *H01M 50/46* (2021.01); *H01M 2004/027* (2013.01); *H01M 2300/0071* (2013.01)

(58) Field of Classification Search
CPC .. H01M 4/131; H01M 50/46; H01M 10/0525; H01M 10/0565; H01M 10/0562; H01M 2300/0071; H01M 2004/027; H01M 10/0566; H01M 2300/0085; H01M 2300/0025; H01M 2300/0082; H01M 2300/0068; H01M 4/62; H01M 4/485; H01M 10/056; H01M 10/058; Y02P 70/50; Y02E 60/10
See application file for complete search history.

(56) References Cited

U.S. PATENT DOCUMENTS

| | | | |
|---|---|---|---|
| 10,056,615 B2 * | 8/2018 | Ise | ............ C01G 49/0018 |
| 10,128,507 B2 | 11/2018 | Ito et al. | |
| 2005/0058907 A1 * | 3/2005 | Kurihara | ............ H01M 4/0419 429/232 |
| 2006/0286456 A1 | 12/2006 | Fu et al. | |
| 2017/0279117 A1 | 9/2017 | Shindo et al. | |
| 2019/0140318 A1 * | 5/2019 | Park | ............ H01M 50/431 |

FOREIGN PATENT DOCUMENTS

DE     102014109237 A1     1/2016

* cited by examiner

*Primary Examiner* — Cynthia K Walls
(74) *Attorney, Agent, or Firm* — David B. Kelley; Brooks Kushman P.C.

(57) ABSTRACT

According to one or more embodiments, a lithium-ion battery includes an anode including titanium niobium oxide (TNO) particles and solid electrolyte particles configured to form an interphase layer therebetween, a cathode including an active material, electronic conductor, and a non-solid electrolyte; and an ionically conductive and liquid-impermeable solid electrolyte separator. The solid electrolyte separator is in direct contact with and between the anode and cathode, and is configured to prevent reduction of the non-solid electrolyte by isolating the non-solid electrolyte from the TNO particles.

20 Claims, 1 Drawing Sheet

HYBRID ELECTROLYTE DESIGN FOR TITANIUM NIOBIUM OXIDE BASED LITHIUM BATTERY

TECHNICAL FIELD

The present disclosure relates to a lithium-ion battery, and more particularly, components to reduce gassing in a lithium-ion battery.

BACKGROUND

Conventional titanium niobium oxide (TNO) based lithium-ion batteries, such as $Ti_2Nb_{10}O_{29}$ and $TiNb_2O_7$ based batteries, use liquid electrolytes. Under certain conditions, such as unusual voltage and temperature, liquid electrolytes in TNO batteries sometimes react at the interphase layer of the active materials to release gas due to reduction of the liquid electrolyte. Some gassing may occur in conventional TNO cells with liquid electrolytes. The rate and amount of gassing is affected by various parameters, including electrolyte solvent type, electrolyte solute type, traces of water in the electrolyte, temperature, and state of charge of the battery.

The main region where gassing may occur is at the TNO-electrolyte interphase layer. To address gassing, additives may be added to the electrolyte, however, these additives may be costly and may reduce the cell performance. Furthermore, although carbon or ceramic coatings on the TNO and organic additives to the electrolyte have been proposed to help reduce gassing at the interphase layer, the coatings and additives may not be as effective under certain conditions.

SUMMARY

According to one or more embodiments, a lithium-ion battery includes an anode including titanium niobium oxide (TNO) particles and solid electrolyte particles configured to form an interphase layer therebetween, a cathode including an active material, electronic conductor, and a non-solid electrolyte, and an ionically conductive and liquid-impermeable solid electrolyte separator. The solid electrolyte separator is in direct contact with and between the anode and cathode, and is configured to prevent reduction of the non-solid electrolyte by isolating the non-solid electrolyte from the TNO particles.

According to at least one embodiment, the solid electrolyte separator may be impermeable with respect to the non-solid electrolyte. In some embodiments, the anode may further include carbon. In one or more embodiments, the TNO material particles may be reduced TNO. In some embodiments, the solid electrolyte particles may be polymer electrolyte particles. In at least one embodiment, the solid electrolyte separator may be a polymer electrolyte separator. In yet other embodiments, the solid electrolyte particles and the solid electrolyte separator may be polymer electrolytes. In one or more embodiments, the non-solid electrolyte may be a liquid electrolyte. In other embodiments, the non-solid electrolyte may be a gel electrolyte.

According to one or more embodiments, a battery includes an ionically conductive and liquid impermeable solid electrolyte separator; and an anode and cathode on opposite sides of and in direct contact with the separator. The cathode includes an active material and a non-solid electrolyte, and the anode includes reduced titanium niobium oxide (TNO) particles and solid electrolyte particles. The separator is arranged to isolate the TNO particles to prevent reduction of the non-solid electrolyte.

According to at least one embodiment, the solid electrolyte may be a polymer electrolyte. In one or more embodiments, the solid electrolyte may be an inorganic electrolyte. In other embodiments, the solid electrolyte may be a sulfide electrolyte. In some embodiments, the solid electrolyte separator may be a polymer electrolyte. According to one or more embodiments, the solid electrolyte separator may be impermeable with respect to the non-solid electrolyte. In certain embodiments, the non-solid electrolyte may be a liquid electrolyte.

According to one or more embodiments, a method of forming a lithium-ion battery comprises providing an anode having titanium niobium oxide (TNO) particles and solid electrolyte particles, providing a cathode including a non-solid electrolyte, and preventing reduction of the non-solid electrolyte by isolating the non-solid electrolyte from the TNO particles by an ionically conductive and liquid-impermeable solid electrolyte separator in direct contact with and between the anode and cathode.

According to at least one embodiment, the solid electrolyte particles may be a polymer electrolyte. In one or more embodiments, the solid electrolyte particles and the solid electrolyte separator may be polymer electrolytes, sulfide electrolytes, or oxide electrolytes. In at least one embodiment, the non-solid electrolyte may be a liquid electrolyte.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

According to embodiments of the present disclosure, a hybrid battery cell is provided. The hybrid battery cell includes a cathode with a non-solid electrolyte, an anode with solid electrolyte, and a solid electrolyte separator therebetween. The solid electrolyte may be a polymer electrolyte. The solid electrolyte separator may be an inorganic, sulfide, or polymer solid electrolyte separator. The non-solid electrolyte may be a liquid or gel electrolyte. The solid electrolyte separator is impermeable such that the non-solid electrolyte is isolated from and stays separate from the anode titanium niobium oxide (TNO) material, thus preventing reduction of the non-solid electrolyte at the surface of the anode TNO material to reduce gassing in the cell.

Figure 1A:
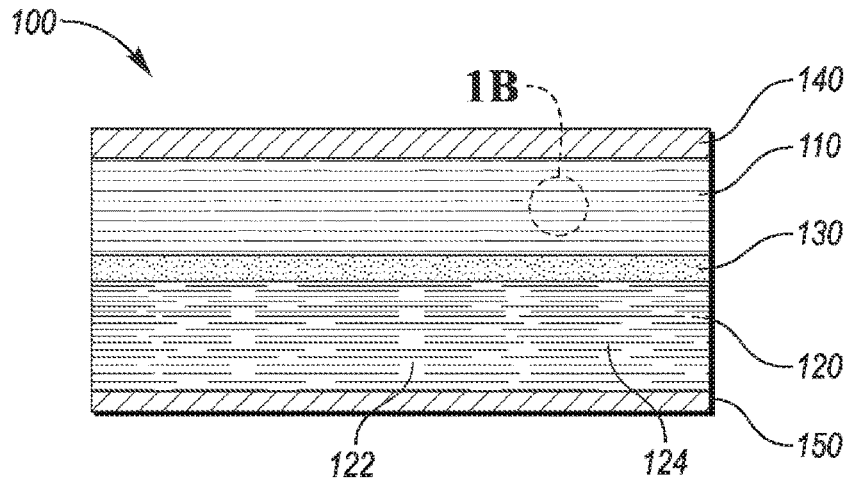
FIG. 1A is a schematic illustration of a cross-section of a hybrid battery cell design, according to an embodiment.
Figure 1B:
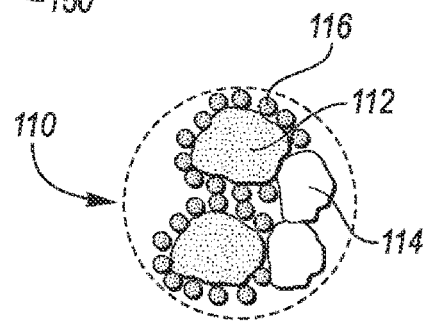
FIG. 1B is a schematic illustration of the anode of the hybrid battery cell design of FIG. 1A.

Referring to FIGS. 1A and 1B, a hybrid battery cell 100 is shown according to an embodiment. Hybrid battery cell 100 includes an anode 110 and a cathode 120, with a solid electrolyte separator 130 between the anode 110 and the cathode 120. Each of the anode 110 and cathode 120 includes a current collector 140, 150, respectively. In an embodiment, the anode 110 is a composite of titanium niobium oxide (TNO) particles 112, solid electrolyte particles 114, and carbon particles 116. The TNO particles may be $Ti_2Nb_{10}O_{29}$ and $TiNb_2O_7$ particles. Although shown with carbon particles, in other embodiments (not shown), the anode may be a composite of TNO particles 112 and solid electrolyte particles 114. The solid electrolyte of the solid electrolyte separator 130 and the solid electrolyte particles 114 may be an inorganic solid electrolyte, a sulfide, a polymer electrolyte, or a combination thereof. The separator formed from any of the solid electrolyte materials is dense enough and formed of a material which avoids permeation of non-solid electrolyte from cathode through the separator, thus preventing contact of the non-solid electrolyte with the anode particle surface.

The cathode 120 includes an active material 122 and an electrolyte 124. The cathode 120 may, in some embodiments, include carbon (not shown). The electrolyte 124 of the cathode 120 is a non-solid electrolyte such as, but not limited to, a liquid electrolyte or polymer gel electrolyte. In an embodiment, the liquid electrolyte may include a lithium salt and an organic solvent. Examples of lithium salts may include, but is not limited to, $LiPF_6$, $LiBF_4$, $LiClO_4$, or mixtures thereof. Suitable organic solvents may include, but is not limited to, ethylene carbonate (EC), dimethyl carbonate (DMC), ethyl methyl carbonate (EMC), diethyl carbonate (DEC), or mixtures thereof. However, any suitable lithium salt and organic solvent combination may be used for the non-solid electrolyte in the cathode.

During the cycling of conventional Li-ion cells, the non-solid electrolytes may permeate through the separator and react with the active materials to cause gassing in the cell. The non-solid electrolyte 124 of cathode 120 is separated from the TNO 112 of the anode 110 by the solid electrolyte separator 130, which is impermeable with respect to the non-solid electrolyte 124. As such, according to one or more embodiments of the present disclosure, the TNO particles 112 are isolated from the non-solid electrolyte, and, thus, the reduction of the non-solid electrolyte is prevented. By preventing the reduction of the non-solid electrolyte at the TNO particles 112 surface, gassing is either eliminated or reduced in the hybrid battery cell 100. Therefore, the hybrid battery design allows for TNO based lithium ion batteries to be more suitable in high temperature environments, such as, for example, inside a car hood.

Figure 2A:
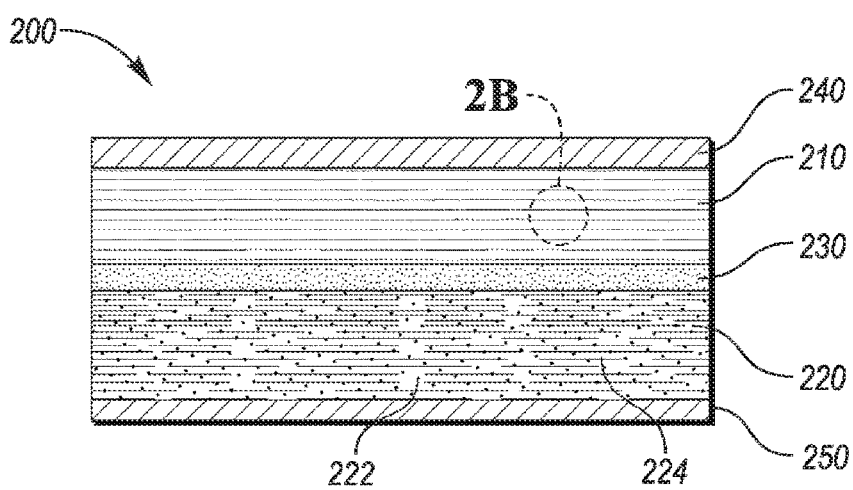
FIG. 2A is a schematic illustration of a cross-section of a hybrid battery cell design, according to another embodiment.
Figure 2B:
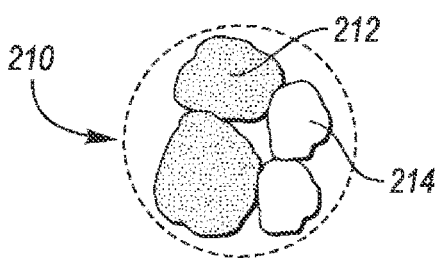
FIG. 2B is a schematic illustration of the anode of the hybrid battery cell design of FIG. 2A.

According to another embodiment, as shown in FIGS. 2A and 2B, a hybrid battery cell 200 is shown. Hybrid battery cell 200 includes an anode 210 and a cathode 220, with a solid electrolyte separator 230 between the anode 210 and the cathode 220. Each of the anode 210 and cathode 220 includes a current collector 240, 250, respectively. In an embodiment, the anode 210 is a composite of reduced TNO ($Ti^{3+}$) particles 212 and solid electrolyte particles 214. The solid electrolyte of the solid electrolyte separator 230 and the solid electrolyte particles 214 may be an inorganic solid electrolyte, a sulfide, a polymer electrolyte, or a combination thereof. The reduced TNO particles 212 of anode 210 have a high electronic conductivity, thus providing sufficient electronic conduction throughout the anode, without the need for additional components (e.g., carbon).

The cathode 220 includes an active material 222 and an electrolyte 224. The cathode 220 may, in some embodiments, include carbon (not shown). The electrolyte 224 of the cathode 220 is a non-solid electrolyte such as, but not limited to, a liquid electrolyte or polymer gel electrolyte. In an embodiment, the liquid electrolyte may include a lithium salt and an organic solvent, similar to the embodiment previously discussed.

During conventional cell operation similar to the above, non-solid electrolytes may permeate a conventional separator and react with the active materials at the interphase layer to cause gassing in the cell. The non-solid electrolyte 224 of cathode 220 is separated from the reduced TNO 212 of the anode 210 by the solid electrolyte separator 230, which is impermeable with respect to the non-solid electrolyte 224. As such, the reduced TNO particles 212 are isolated from the non-solid electrolyte, and, thus, the reduction of the non-solid electrolyte is prevented. By preventing the reduction of the non-solid electrolyte at the reduced TNO particles 212 surface, gassing is either eliminated or reduced in the hybrid battery cell 200.

In at least one embodiment, a method of forming a lithium ion battery includes providing an anode having titanium niobium oxide (TNO) particles and solid electrolyte particles. The TNO particles and the solid electrolyte particles form an interphase layer therebetween during battery cycling. The method also includes providing a cathode including a non-solid electrolyte. Reduction of the non-solid electrolyte in the lithium ion battery is prevented by isolating the non-solid electrolyte from the TNO particles by an ionically conductive and liquid-impermeable solid electrolyte separator in direct contact with and between the anode and cathode.

The cathode, anode, or both, may be formed using any suitable method, such as from green sheets. Similarly, the solid electrolyte separator may be formed using any suitable method, such as by forming a green sheet. In some embodiments, where the layers of the lithium ion battery are green sheets, the layers are stacked to form the cell. In certain embodiments, to form a flexible hybrid cell, the hybrid cell may include a polymer electrolyte in both the anode as the solid electrolyte, and as the solid electrolyte separator. In some cases, if the anode and separator green sheets contain inorganic electrolyte, then the green sheets are sintered at high temperature.

According to embodiments of the present disclosure, a hybrid battery cell is provided. The hybrid battery cell includes a cathode with a non-solid electrolyte, an anode with a solid electrolyte, and an impermeable solid electrolyte separator therebetween. The solid electrolyte may be a polymer electrolyte. The solid electrolyte separator may be an inorganic, sulfide, or polymer solid electrolyte separator. The non-solid electrolyte may be a liquid electrolyte. The solid electrolyte separator is impermeable with respect to the non-solid electrolyte such that it is isolated from the anode active material, thus preventing reduction of the non-solid electrolyte at the surface of the active material, and reducing gassing in the cell.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A lithium-ion battery comprising:
   an anode including titanium niobium oxide (TNO) particles and solid electrolyte particles configured to form an interphase layer therebetween;
   a cathode including an active material, electronic conductor, and a non-solid electrolyte; and
   an ionically conductive and liquid-impermeable solid electrolyte separator in direct contact with and between the anode and cathode and configured to prevent reduction of the non-solid electrolyte by isolating the non-solid electrolyte from the TNO particles.

2. The lithium-ion battery of claim 1, wherein the solid electrolyte separator is impermeable with respect to the non-solid electrolyte.

3. The lithium-ion battery of claim 1, wherein the anode further includes carbon.

4. The lithium-ion battery of claim 1, wherein the TNO particles are reduced TNO.

5. The lithium-ion battery of claim 1, wherein the solid electrolyte particles are polymer electrolyte particles.

6. The lithium-ion battery of claim 1, wherein the solid electrolyte separator is a polymer electrolyte separator.

7. The lithium-ion battery of claim 1, wherein the solid electrolyte particles and the solid electrolyte separator are polymer electrolytes.

8. The lithium-ion battery of claim 1, wherein the non-solid electrolyte is a liquid electrolyte.

9. The lithium-ion battery of claim 1, wherein the non-solid electrolyte is a gel electrolyte.

10. A battery comprising:
    an ionically conductive and liquid impermeable solid electrolyte separator; and
    an anode and cathode on opposite sides of and in direct contact with the separator, the cathode including an active material and a non-solid electrolyte, the anode including reduced titanium niobium oxide (TNO) particles and solid electrolyte particles, and the separator arranged to isolate the TNO particles to prevent reduction of the non-solid electrolyte.

11. The battery of claim 10, wherein the solid electrolyte particles is a polymer electrolyte.

12. The battery of claim 10, wherein the solid electrolyte particles is an inorganic electrolyte.

13. The battery of claim 10, wherein the solid electrolyte particles is a sulfide electrolyte.

14. The battery of claim 10, wherein the solid electrolyte separator is a polymer electrolyte.

15. The battery of claim 10, wherein the solid electrolyte separator is impermeable with respect to the non-solid electrolyte.

16. The battery of claim 10, wherein the non-solid electrolyte is a liquid electrolyte.

17. A method of forming a lithium-ion battery, the method comprising:
    providing an anode having titanium niobium oxide (TNO) particles and solid electrolyte particles;
    providing a cathode including a non-solid electrolyte; and
    preventing reduction of the non-solid electrolyte by isolating the non-solid electrolyte from the TNO particles by an ionically conductive and liquid-impermeable solid electrolyte separator in direct contact with and between the anode and cathode.

18. The method of claim 17, wherein the solid electrolyte particles are a polymer electrolyte, a sulfide electrolyte, or an oxide electrolyte.

19. The method of claim 17, wherein the solid electrolyte particles and the solid electrolyte separator are polymer electrolytes.

20. The method of claim 17, wherein the non-solid electrolyte is a liquid electrolyte.

* * * * *